US011361294B2

(12) United States Patent
Kore et al.

(10) Patent No.: US 11,361,294 B2
(45) Date of Patent: Jun. 14, 2022

(54) SYSTEMS AND METHODS FOR CREATING AND ACTIVATING A LICENSE

(71) Applicant: Ciena Corporation, Hanover, MD (US)

(72) Inventors: Mallikarjunappa Kore, Alpharetta, GA (US); Aung Htay, Alpharetta, GA (US); Paul Hudgins, Roswell, GA (US); Marek Gimza, Peachtree Corners, GA (US)

(73) Assignee: Ciena Corporation, Hanover, MD (US)

( * ) Notice: Subject to any disclaimer, the term of this patent is extended or adjusted under 35 U.S.C. 154(b) by 231 days.

(21) Appl. No.: 15/931,979

(22) Filed: May 14, 2020

(65) Prior Publication Data
US 2021/0357891 A1 Nov. 18, 2021

(51) Int. Cl.
| | |
|---|---|
| *G06Q 20/12* | (2012.01) |
| *G06F 21/10* | (2013.01) |
| *G06Q 20/38* | (2012.01) |
| *G06Q 30/06* | (2012.01) |
| *H04L 9/06* | (2006.01) |
| *H04L 9/32* | (2006.01) |

(52) U.S. Cl.
CPC ....... *G06Q 20/1235* (2013.01); *G06F 21/105* (2013.01); *G06Q 20/3829* (2013.01); *G06Q 30/0635* (2013.01); *H04L 9/0637* (2013.01)

(58) Field of Classification Search
CPC .......... G06Q 20/1235; G06Q 20/3829; G06Q 30/0635; G06F 21/105; H04L 9/0637
USPC .......................................................... 705/59
See application file for complete search history.

(56) References Cited

U.S. PATENT DOCUMENTS

| | | | |
|---|---|---|---|
| 8,887,991 | B2 | 11/2014 | Htay et al. |
| 9,485,660 | B2 | 11/2016 | Cote et al. |
| 9,503,228 | B2 | 11/2016 | Subhedar et al. |
| 9,509,551 | B2 | 11/2016 | Chou et al. |
| 9,806,973 | B2 | 10/2017 | Htay et al. |
| 9,838,421 | B2 | 12/2017 | Htay et al. |
| 9,847,951 | B2 | 12/2017 | Htay et al. |
| 9,860,314 | B2 | 1/2018 | Kore et al. |
| 10,050,991 | B2 | 8/2018 | Htay |

(Continued)

OTHER PUBLICATIONS

Magnanini et al. ("Efficient License Management Based on Smart Contracts Between Software Vendors and Service Providers", University of Modena and Reggio Emilia, IEEEXplore, Aug. 23, 2019, 6 pages) (Year: 2019).*

*Primary Examiner* — James D Nigh
(74) *Attorney, Agent, or Firm* — Clements Bernard Baratta; Lawrence A. Baratta, Jr.; Christopher L. Bernard

(57) ABSTRACT

Systems and methods for creating a license during a purchasing process between a customer and a vendor are provided. In one implementation, a method may be executable by a vendor system in communication with a customer device in a decentralized computing infrastructure. The method may include the steps of receiving a purchase order from a customer to initiate a purchase of a software or hardware product, where the customer is associated with the customer device, and receiving a public key from the customer. Additionally, the method may include the steps of creating a smart contract for controlling a license related to the purchase of the software or hardware product and sending a contract address associated with the smart contract to the customer to enable the customer to activate the software or hardware product.

20 Claims, 5 Drawing Sheets

(56) References Cited

U.S. PATENT DOCUMENTS

| | | | |
|---|---|---|---|
| 10,110,500 | B2 | 10/2018 | Kore et al. |
| 10,511,517 | B2 | 12/2019 | Subhedar et al. |
| 2015/0063800 | A1 | 3/2015 | Htay |
| 2016/0057039 | A1 | 2/2016 | Htay et al. |
| 2016/0300227 | A1 | 10/2016 | Subhedar et al. |
| 2017/0086208 | A1 | 3/2017 | Côté et al. |
| 2017/0104635 | A1 | 4/2017 | Htay et al. |
| 2017/0371692 | A1 | 12/2017 | Connolly et al. |
| 2018/0054360 | A1 | 2/2018 | Htay |
| 2018/0165110 | A1 | 6/2018 | Htay |
| 2018/0314809 | A1* | 11/2018 | Mintz .................. H04L 9/0637 |
| 2018/0337942 | A1 | 11/2018 | Htay et al. |
| 2019/0392118 | A1* | 12/2019 | Elden .................... H04L 9/3239 |
| 2020/0134139 | A1* | 4/2020 | Vaish ................... G06F 21/105 |

\* cited by examiner

SYSTEMS AND METHODS FOR CREATING AND ACTIVATING A LICENSE

TECHNICAL FIELD

The present disclosure generally relates to hardware and software products and more particularly relates to licensing the hardware and software products to a customer during a purchasing process.

BACKGROUND

In the field of computing devices and communication networks, vendors may sell hardware and software products to customers. Typically, the purchasing process may involve an agreement between the vendor and customer to define the rights of the customer to operate the products within specific guidelines. This agreement may be described in a license or license agreement between the vendor and customer.

FIG. 1 is a flow diagram showing a conventional model of a process 10 for licensing a software or hardware product. A product is purchased by a customer and installed on the customer's computer system or on a network element of a communications network. The steps for licensing the product according to conventional procedures may include multiple steps, which are typically performed manually by the customer and may be very time consuming. As shown in FIG. 1, the conventional process 10 shows actions that are taken by the customer (depicted at the top of the drawing), while actions taken by the vendor are depicted at the bottom of the drawing. Certain actions are taken to obtain a license (shown on the left side of the drawings), while other actions are taken to activate the license (shown on the right side of the drawing).

The conventional licensing process 10 of FIG. 1 includes a first step where the customer places an order (block 12) for a product to be sold by the vendor. The order information is processed by the vendor, as indicated in block 30, in a license generating procedure. For example, block 30 shows that the vendor may execute the steps of generating a license, uploading the license to a portal (e.g., portal 34), and aligning a license generation date with a shipping date (e.g., Post Office ship date). The customer is then required to generate a Licensing Request, as indicated in block 14. The vendor sends an activation code, as indicated in block 32. The license activation code is received by the customer, as indicated in block 16. The license activation code may be sent from the vendor to the customer via an e-mail message, text message, phone message, or other type of message.

The customer uses the License Request (from block 14) and the received activation code (from block 16) to reserve the Licenses. Block 18 includes the process where the customer can obtain the license from the portal 34 by sending the activation code. In response to the proper activation code, a license file is downloaded from the portal 34 to a customer device (e.g., computer). This concludes the lengthy process of obtaining a license.

After obtaining the license, the customer can then perform additional steps to activate the license. The customer transfers the license file to a License Server, as indicated in block 20. The process 10 then includes the step of allowing the customer to provision the license server on the user device.

FIG. 2 is a diagram showing a license server deployment 40 in a single host system 42 and a multi-host system 44. In this conventional arrangement, a license server can be moved to separate hosts or Virtual Machines (VMs), which may be an important enabler for a license server in a Network Management System (NMS). The license server in the NMS normally requires license servers in separate VMs/hosts from the NMS. The license server configurations (e.g., single host 42 or multi-host 44), which may have an interim exception configuration with license server co-resident with the NMS, must be reconfigured to a separate host by the NMS to provide replication for the license server.

One of the shortcomings of the conventional systems is that it normally requires many manual processes for the customer. Also, the processes may be dependent on a third-party license server. The deployment may be quite involved, as shown in the conventional configuration of FIG. 2. Therefore, there is a need in the field of hardware and software sales to simplify the licensing process, particularly for reducing the number of steps that might be required by the customer.

BRIEF SUMMARY

The present disclosure is directed to a decentralized computing system for enabling communication between a customer device and a vendor device. The system may be configured with a distributed ledger for storing a smart contract on each of the customer device and vendor device to enable an licensing procedure, which is executed during a purchasing process, allowing a customer to license a software or hardware product with fewer steps than conventional processes in order to simplify the process for the customer.

According to one embodiment of the present disclosure, a vendor system may be in communication with a customer device in a decentralized computing infrastructure. The vendor system may include a processing device and a memory device configured to store a computer program having instructions. When executed, the instructions cause the processing device to receive a purchase order from a customer to initiate a purchase of a software or hardware product, where the customer is associated with the customer device. The processing device is further configured to receive a public key from the customer. Then, the processing device may create a smart contract for controlling a license related to the purchase of the software or hardware product and send a contract address associated with the smart contract to the customer to enable the customer to activate the software or hardware product.

According to another embodiment of the present disclosure, a non-transitory computer-readable medium may be configured to store computer logic in a vendor system in communication with a customer device in a decentralized computing infrastructure. The computer logic may include instructions that, when executed, cause one or more processing devices to receive a purchase order from a customer to initiate a purchase of a software or hardware product, whereby the customer may be associated with the customer device. The instructions further cause the one or more processing devices to receive a public key from the customer. With this information, the one or more processing devices are configured to create a smart contract for controlling a license related to the purchase of the software or hardware product and send a contract address associated with the smart contract to the customer to enable the customer to activate the software or hardware product.

According to yet another embodiment of the present disclosure, a method may be executable by a vendor system in communication with a customer device in a decentralized computing infrastructure. The method may include the steps of receiving a purchase order from a customer to initiate a purchase of a software or hardware product, the customer associated with the customer device, and receiving a public key from the customer. Furthermore, the method may include creating a smart contract for controlling a license related to the purchase of the software or hardware product and sending a contract address associated with the smart contract to the customer to enable the customer to activate the software or hardware product.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

The present disclosure relates to systems and methods utilizing a decentralized computing infrastructure (e.g., blockchains) to license software products and/or hardware products for customers in different regions. According to various examples described in the present disclosure, Ethereum may be considered as an exemplary implementation. In contrast to conventional processes, the systems and methods of the present disclosure may use smart contracts to control licensing. The embodiments of the present disclosure can be implemented on either public or private blockchain.

Figure 3:
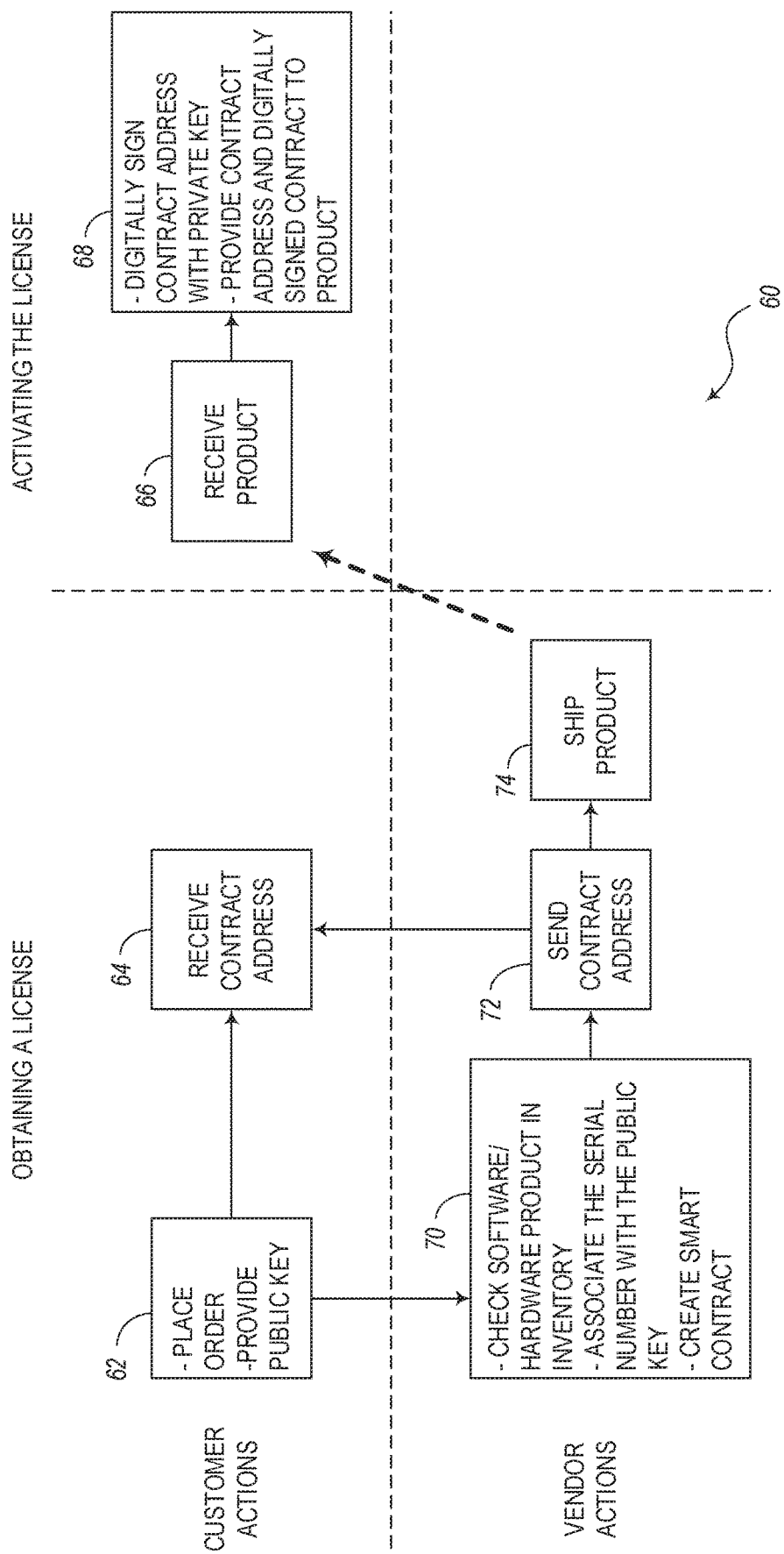
FIG. 3 is a flow diagram showing a first process for obtaining and activating a license for the sale of a software or hardware product, according to various embodiments of the present disclosure.

A customer may order hardware (e.g., a chassis of a network element), which may be associated with the embodiment described with respect to FIG. 3, whereby a customer can order and activate certain hardware, such as the chassis. Then, the customer may order software (e.g., a base kit for the chassis), which may be associated with the embodiment described with respect to FIG. 4. For example, the customer, according to one embodiment, may order a terrestrial L-band base kit for the chassis.

The operating principles of the various embodiments of the present disclosure may be described with respect to a series of use cases. The present disclosure may provide systems and methods for simplifying the licensing process, including the example use cases described in the following. In contrast to the conventional processes that may require multiple manual steps, one process of the present disclosure may include using blockchain and distributing the transactions between the customer and vendor. In particular, many steps are executed by the vendor to simplify the customer's experience. Highly available and transparent transactions can be accessible anytime providing 100% auditability without failure. There may be no need of a Licensing Server, which requires additional hardware/host/VMs with certain system requirements.

According to one embodiment, a process may include developing a contract. Contracts may typically be written in a high-level language, such as Solidity. However, in order to run, they must be compiled to the low-level bytecode that runs in the Ethereum Virtual Machine (EVM). Once compiled, they are deployed on the Ethereum platform using a special contract creation transaction, which is identified as such by being sent to the special contract creation address, namely 0x0. Contracts only run if they are called by a transaction. In the following sections, for example, blockchain addresses may be shortened (e.g., "ADR1") for ease of reading. The following is an example of an actual address:
0xCA9Aa967E5c83B72F75832D17b9daa84E5836eE4

The process may include developing and deploying a contract and license.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

Figure 1:
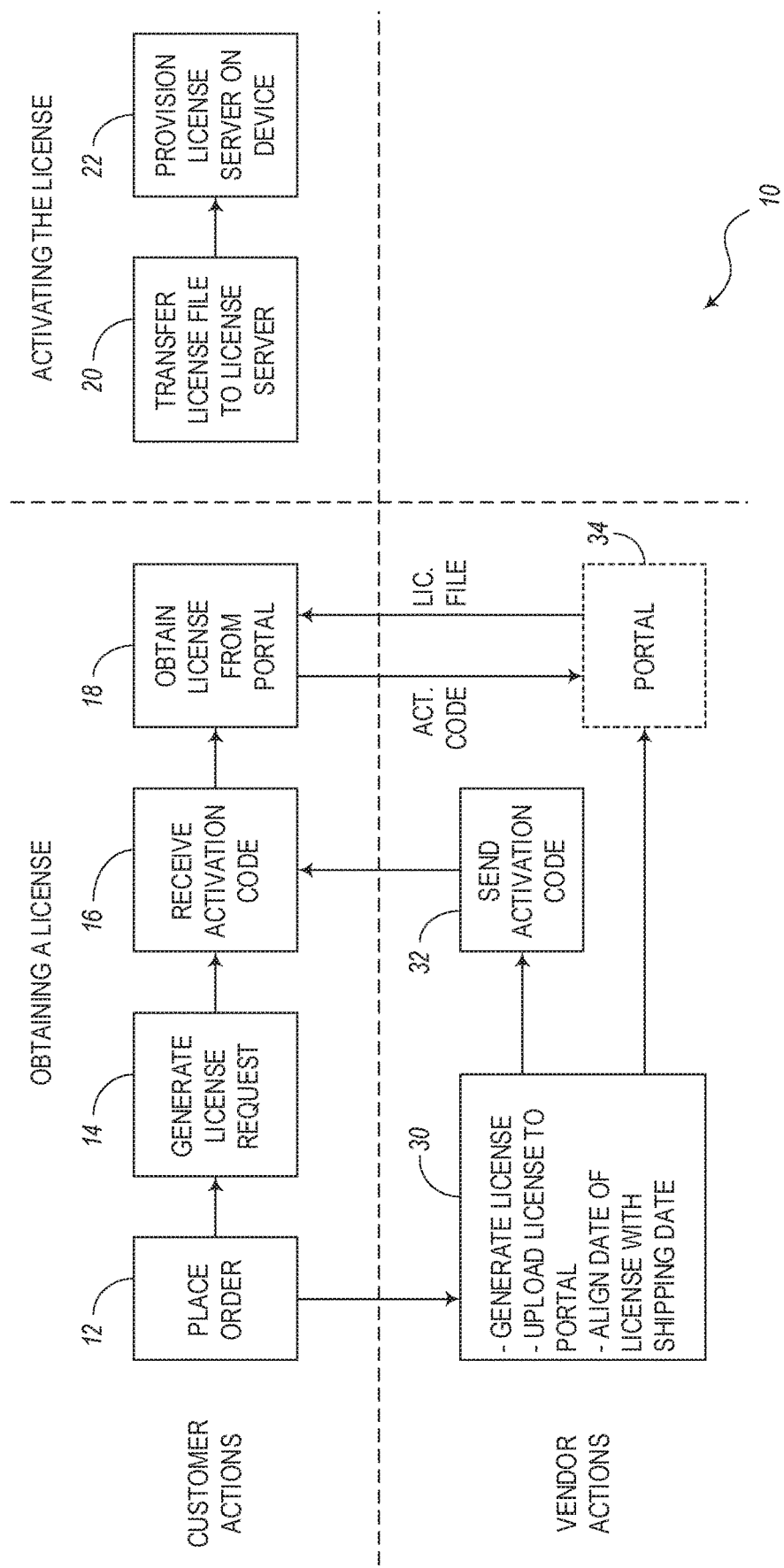
FIG. 1 is a flow diagram showing a conventional process for obtaining and activating a license for the sale of a software or hardware product.

FIG. 3 is a flow diagram illustrating an embodiment of a decentralized licensing process 60 for developing licensing plans for new hardware purchased by a customer. The process 60 may be a decentralized licensing process. The top portion of the drawing represents steps executed by a customer and the bottom portion represents steps executed by the vendor. In comparison with FIG. 1, it can be seen that the steps required by the customer are greatly simplified, thereby enhancing the customer experience for licensing the hardware product to be purchased. The hardware may include any new box, equipment, etc.

The process 60 may be executed on a decentralized computing infrastructure. In this respect, a first computing system associated with a customer may be configured to communicate with a second computing system associated with a vendor. Each computing system may be configured to store data (e.g., product numbers, serial numbers, public keys, private keys, etc.) in its own respective ledger. Therefore, in this respect, the system that performs the process 60 of FIG. 3 may be referred to as a distributed ledger system where each party maintains its own ledger of pertinent data that may be used for the licensing processes described herein. The distributed ledger system can be configured with a design of a blockchain system, which can be either public or private.

A blockchain system relates to the recording of a "blockchain," which is a cumulative list of records (e.g., also referred to as blocks) that are linked using cryptography. Each block contains a cryptographic hash of a previous block, a timestamp, and transaction data (e.g., represented as a Merkle tree). Data in the blocks of a blockchain cannot be modified. The blockchain system can be configured as an open, distributed ledger that records transactions between the first computing system associated with the customer and the second computing system associated with the vendor. Once recorded, the data in any given block cannot be altered retroactively without alteration of all subsequent blocks, which requires consensus of the network majority. Although blockchain records are not unalterable, blockchains may be considered secure by design and exemplify a distributed computing system with high Byzantine fault tolerance. Decentralized consensus has therefore been claimed with a blockchain.[8]

Therefore, the systems of the present disclosure may utilize any suitable type of cryptography for the transmission of secure data. In some embodiments, public-key cryptography may be used, whereby a public key can be disseminated to at least the customer computer system and the vendor computer system. Also, a respective private key, stored on each computer system, is known only to the respective owner. The public and private keys can be generated using cryptographic algorithms. To ensure effective security, the private keys are kept private, although the public key can be widely and openly distributed without compromising security. In such a system, any computing system can encrypt a message using a public key, but the encrypted message can only be decrypted with a receiver's private key.

As shown in FIG. 3, the process 60 includes the customer placing an order and providing a public key, as indicated in block 62. The order may be placed using a portal of the vendor's system. The purchase order may include a product code (e.g., "K86-3000-900") for a hardware product. During the ordering step, the customer provides his or her public key (e.g., "PK1").

Block 70 shows a vendor action representing a portal backend process. As indicated in block 70, the process includes checking the available inventory for the software/hardware product. The step 70 also includes associating a serial number with the public key (e.g., PK1). In this example, there is one product available, having a serial number (e.g., serial number "M8770651"). The step 70 also creates a smart contract (e.g., using information such as PK1, M8770651, meta data, etc.) and deploys it on the blockchain. For example, a "smart contract" may refer to a computer protocol intended to digitally facilitate, verify, and enforce the negotiation and performance of a contract, license, digital agreement, etc. Smart contracts are typical traceable and irreversible and may be negotiated without a third party. A contract address (e.g., ADR1) is associated with this contract, which is then communicated back to the customer, as indicated by block 72. It should be noted that the vendor portal may internally store an association between the customer and the address (e.g., ADR1) off the blockchain. The customer receives this contract address, as indicated in block 64.

After sending the contract address to the customer, the vendor is configured to ship the product (e.g., chassis) to the customer, as indicated in block 74. In this example, the product has the serial number M8770651 associated with the product. The customer receives the product (e.g., chassis), as indicated in block 66. The customer may then power on the product (e.g., chassis) and then, according to block 68, the customer provides the contract address (e.g., ADR1) and a digital signature (e.g., "DS1") signing the ADR1 with a private key that corresponds to the public key. The contract address may be digitally signed with the private key.

The blockchain-aware process 60 on the hardware product may use ADR1 and may retrieve the state/information of the smart contract. Using PK1 from the smart contract, the process 60 can further verify that the customer is valid, based on the verification that the customer provides the correct digital signature. After this validation, the process can use the serial number (e.g., M8770651) and other pertinent information from the meta data to "validate" the licensing of the product (e.g., chassis) to the customer.

Figure 4:
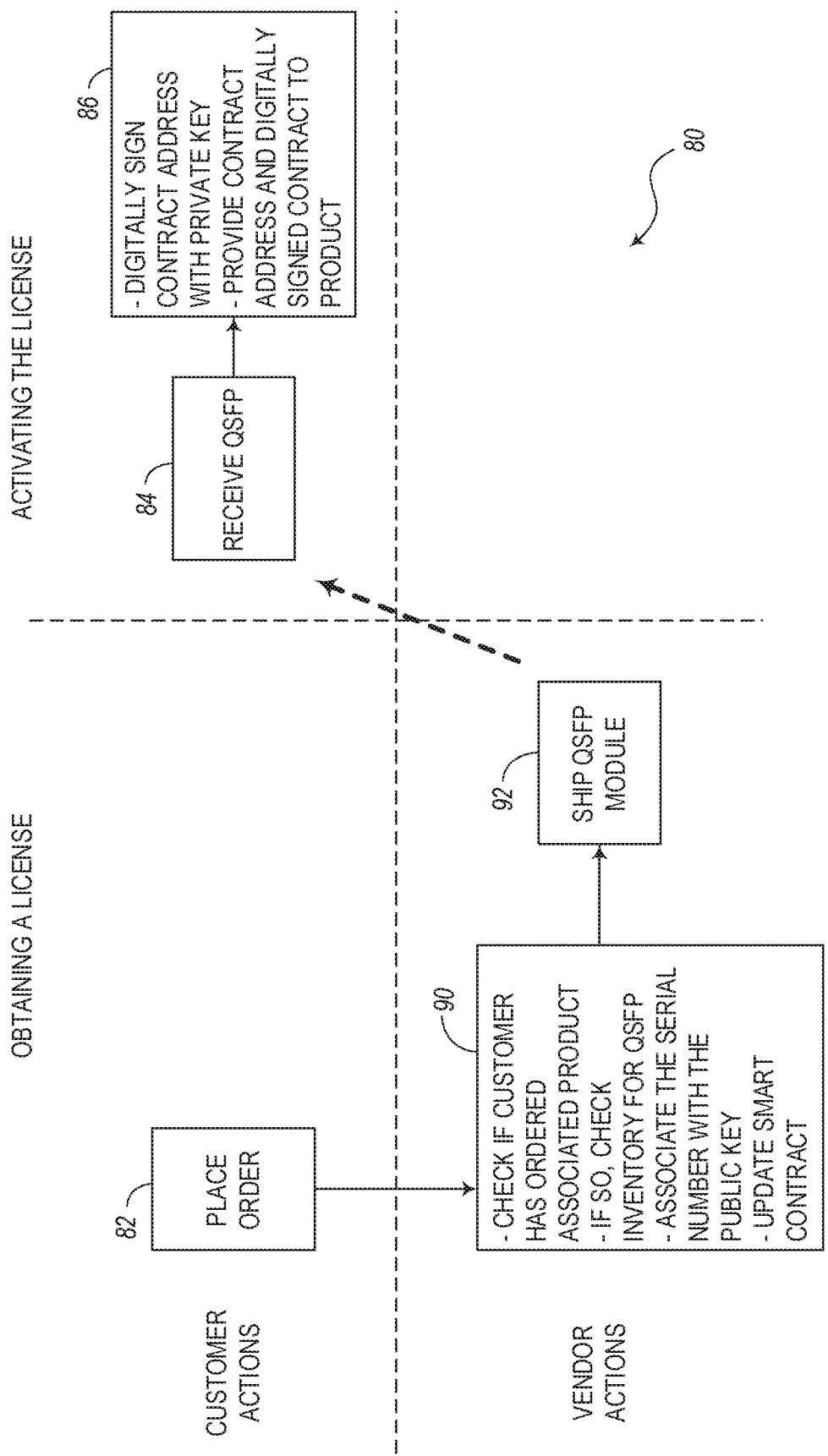
FIG. 4 is a flow diagram showing a second process for obtaining and activating a license for the sale of a software or hardware product, according to various embodiments of the present disclosure.

FIG. 4 is a flow diagram illustrating an embodiment of a decentralized process 80 to enable a customer to purchase equipment or a software product and create a license. Again, the customer actions are shown at the top of the drawing, while the vendor actions are shown at the bottom. Also, in comparison with FIG. 1, it should be recognized that the process 80 of FIG. 4 greatly simplifies the licensing procedures for the customers. Therefore, providing the licensing process 80 of FIG. 4, the customer can have a simpler, less time-consuming licensing experience, thereby providing greater customer satisfaction during such a process that can normally be tedious and lengthy.

The process 80 includes the step (block 82) of enabling the customer to place an order for hardware and/or software products. In this example, the product may be software, such as a terrestrial L-Band base kit for optical networking. The customer can place the order (block 82) using a portal associated with the vendor. The order may include a product having a product code (e.g., K86-3000-900).

The portal backend process (e.g., block 90 of the vendor actions) may be configured to check if the customer has previously ordered a product associated with the software/feature that can run on the product. This check can be made to find a software product (e.g., software component having product code "K86-3100-900") that may be compatible with a previously purchased hardware product (e.g., hardware component having product code "K86-3000-900"). In this example, it may be determined that there has only been one product already shipped to the respective customer with the corresponding serial number (e.g., M8770651).

Next, the portal process (block 90) checks inventory for availability of the product or module. For example, there may be one with the serial number "FNSRMYUYF0H7Z" available. The portal process (block 90) updates ADR1 with M8770651 and maps the serial number (e.g., FNSRMYUYF0H7Z) and other associated meta data in a smart contract. After the processing in block 90, the vendor is configured to perform the process step 92 of shipping the product (e.g., Quad Small Form-factor Pluggable (QSFP)) to the customer.

The customer then receives the product (e.g., QSPF), as indicated in block 84, and may then plug the product on the chassis. When power is supplied to the products, the customer then performs the process 86 of providing the address (e.g., ADR1) and a digital signature (e.g., DS1) of ADR1 signed with the private key. The private key may correspond to the public key mentioned with respect to block 90.

The blockchain-aware process 80 may be configured to use the address (e.g., ADR1) and retrieve the state/information of the smart contract. Using PK1, the process 80 can further verify that the customer is valid (as only he/she has the private key). After this validation, the process 80 can use the serial numbers (e.g., M8770651, FNSRMYUYF0H7Z, etc.) and other pertinent information from the meta data to "validate" the licensing of the product (e.g., QSFP) on the correct chassis to the customer. It then allows a feature set (e.g., S86-LIC-TERBASE, S86-LIC-TERADD100G, etc.) that is associated with product code (e.g., K86-3100-900) that the customer ordered.

Figure 5:
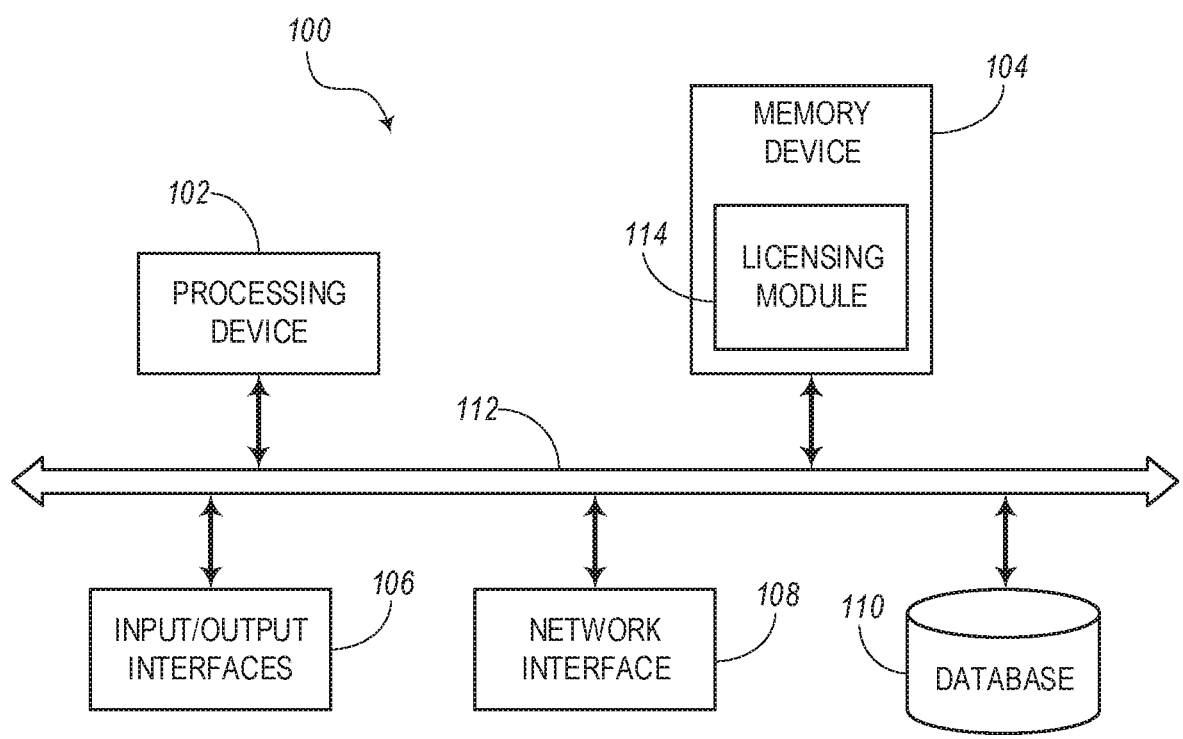
FIG. 5 is a schematic diagram showing a computer system for controlling a licensing process, according to various embodiments.

FIG. 5 is a block diagram illustrating an embodiment of a licensing system 100 for enabling licensing processes between a customer and a vendor. The licensing system 100 may be decentralized system, whereby a portion of the functions of the licensing system 100 may be executed on a customer computing system (e.g., for performing the "customer actions") and another portion of the functions may be executed on a vendor computing system (e.g., for performing the "vendor actions"). In the illustrated embodiment, the licensing system 100 may be a digital computer that, in terms of hardware architecture, generally includes a processing device 102, a memory device 104, Input/Output (I/O) interfaces 106, a network interface 108, and a database 110. The memory device 104 may include a data store, database (e.g., database 110), or the like.

The licensing system 100 also includes a licensing module 114, which may be configured in hardware, software, firmware, or any combination thereof. In one embodiment, the licensing module 114 is configured as software and stored in the memory device 104 and executable by the processing device 102. The licensing module 114 may be configured to coordinate the actions of the customer and vendor during a purchasing procedure to create and activate a license or other type of agreement between the customer and vendor. The processes for creating and activating the licenses may be represented by the flow diagrams 60, 80 described with respect to FIGS. 3 and 4. The licensing system 100 may be configured as a distributed ledger of a peer-to-peer network to manage a blockchain. The system 100 may be configured to adhere to a protocol for inter-node communication and validating new blocks.

It should be appreciated by those of ordinary skill in the art that FIG. 5 depicts the licensing system 100 in a simplified manner, where practical embodiments may include additional components and suitably configured processing logic to support known or conventional operating features that are not described in detail herein. The components (i.e., 102, 104, 106, 108, 110) are communicatively coupled via a local interface 112. The local interface 112 may be, for example, but not limited to, one or more buses or other wired or wireless connections. The local interface 112 may have additional elements, which are omitted for simplicity, such as controllers, buffers, caches, drivers, repeaters, receivers, among other elements, to enable communications. Further, the local interface 112 may include address, control, and/or data connections to enable appropriate communications among the components 102, 104, 106, 108, 110.

The processing device 102 is a hardware device adapted for at least executing software instructions. The processing device 102 may be any custom made or commercially available processor, a Central Processing Unit (CPU), an auxiliary processor among several processors associated with the licensing system 100, a semiconductor-based microprocessor (in the form of a microchip or chip set), or generally any device for executing software instructions. When the licensing system 100 is in operation, the processing device 102 may be configured to execute software stored within the memory device 104, to communicate data to and from the memory device 104, and to generally control operations of the licensing system 100 pursuant to the software instructions.

It will be appreciated that some embodiments of the processing device 102 described herein may include one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), and the like). The processing device 102 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 106 may be used to receive user input from and/or for providing system output to one or more devices or components. User input may be provided via, for example, a keyboard, touchpad, a mouse, and/or other input receiving devices. The system output may be provided via a display device, monitor, Graphical User Interface (GUI), a printer, and/or other user output devices. I/O interfaces 106 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an Infra-Red (IR) interface, a Radio Frequency (RF) interface, and a Universal Serial Bus (USB) interface.

The network interface 108 may be used to enable the licensing system 100 to communicate over a network, such as the Internet, a Wide Area Network (WAN), a Local Area Network (LAN), and the like. The network interface 108 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 108 may include address, control, and/or data connections to enable appropriate communications on the network.

The memory device 104 may include volatile memory elements (e.g., Random Access Memory (RAM)), such as Dynamic RAM (DRAM), Synchronous DRAM (SDRAM), Static RAM (SRAM), and the like, nonvolatile memory elements (e.g., Read Only Memory (ROM), hard drive, tape, Compact Disc ROM (CD-ROM), and the like), and combinations thereof. Moreover, the memory device 104 may incorporate electronic, magnetic, optical, and/or other types of storage media. The memory device 104 may have a distributed architecture, where various components are situated remotely from one another, but can be accessed by the processing device 102. The software in memory device 104 may include one or more software programs, each of which may include an ordered listing of executable instructions for implementing logical functions. The software in the memory device 104 may also include a suitable Operating System (O/S) and one or more computer programs. The O/S essentially controls the execution of other computer programs, and provides scheduling, input-output control, file and data management, memory management, and communication control and related services. The computer programs may be configured to implement the various processes, algorithms, methods, techniques, etc. described herein.

The memory device 104 may include a data store used to store data. In one example, the data store may be located internal to the licensing system 100 and may include, for example, an internal hard drive connected to the local interface 112 in the licensing system 100. Additionally, in another embodiment, the data store may be located external to the licensing system 100 and may include, for example, an external hard drive connected to the Input/Output (I/O) interfaces 106 (e.g., SCSI or USB connection). In a further embodiment, the data store may be connected to the licensing system 100 through a network and may include, for example, a network attached file server.

Moreover, some embodiments may include a non-transitory computer-readable storage medium having computer readable code stored in the memory device 104 for programming the licensing system 100 or other processor-equipped computer, server, appliance, device, circuit, etc., to perform functions as described herein. Examples of such non-transitory computer-readable storage mediums include, but are not limited to, a hard disk, an optical storage device, a magnetic storage device, a Read Only Memory (ROM), a Programmable ROM (PROM), an Erasable PROM (EPROM), and Electrically Erasable PROM (EEPROM), Flash memory, and the like. When stored in the non-transitory computer-readable medium, software can include instructions executable by the processing device 102 that, in response to such execution, cause the processing device 102 to perform a set of operations, steps, methods, processes, algorithms, functions, techniques, etc. as described herein for the various embodiments.

Therefore, according to the various embodiments described above, the processes may include numerous points of novelty, such as provide high availability, auditability, transparency, and neutrality. A license interaction according to the embodiments described herein may be stored indefinitely in the blockchain. Also, the licensing may include a Zero Touch Provisioning (ZTP) process, which may be referred to as zero touch licensing with the ability to utilize a ZTP process. For example, ZTP is a feature of a switch, node, server, etc. that allows the customer device and vendor device to be provisioned and configured automatically, eliminating the manual steps typically involved with adding a new product to a network. ZTP allows the hardware to be installed directly into the network environment, which constitutes the last manual action. When the new product is powered on, the switch may download and run a stored configuration.

Implementations of the present disclosure may include systems and methods associated with the licensing system 100. For example, the licensing module 114 may enable the licensing system 100 to be configured as a vendor system and may include a process executable by the vendor system that is in communication with or is operating with a customer device in a decentralized computing infrastructure. The process, for example, may include the steps of receiving a purchase order from a user (e.g., customer) to initiate a purchase of a software or hardware product, where the user (e.g., customer) may be associated in any manner with the customer device. The process may also include receiving a public key from the customer, such as via the customer device itself. In addition, the process may include the steps of creating a smart contract for controlling a license related to the purchase of the software or hardware product and sending a contract address associated with the smart contract to the customer to enable the customer to activate the software or hardware product, which may be on the customer device.

Figure 2:
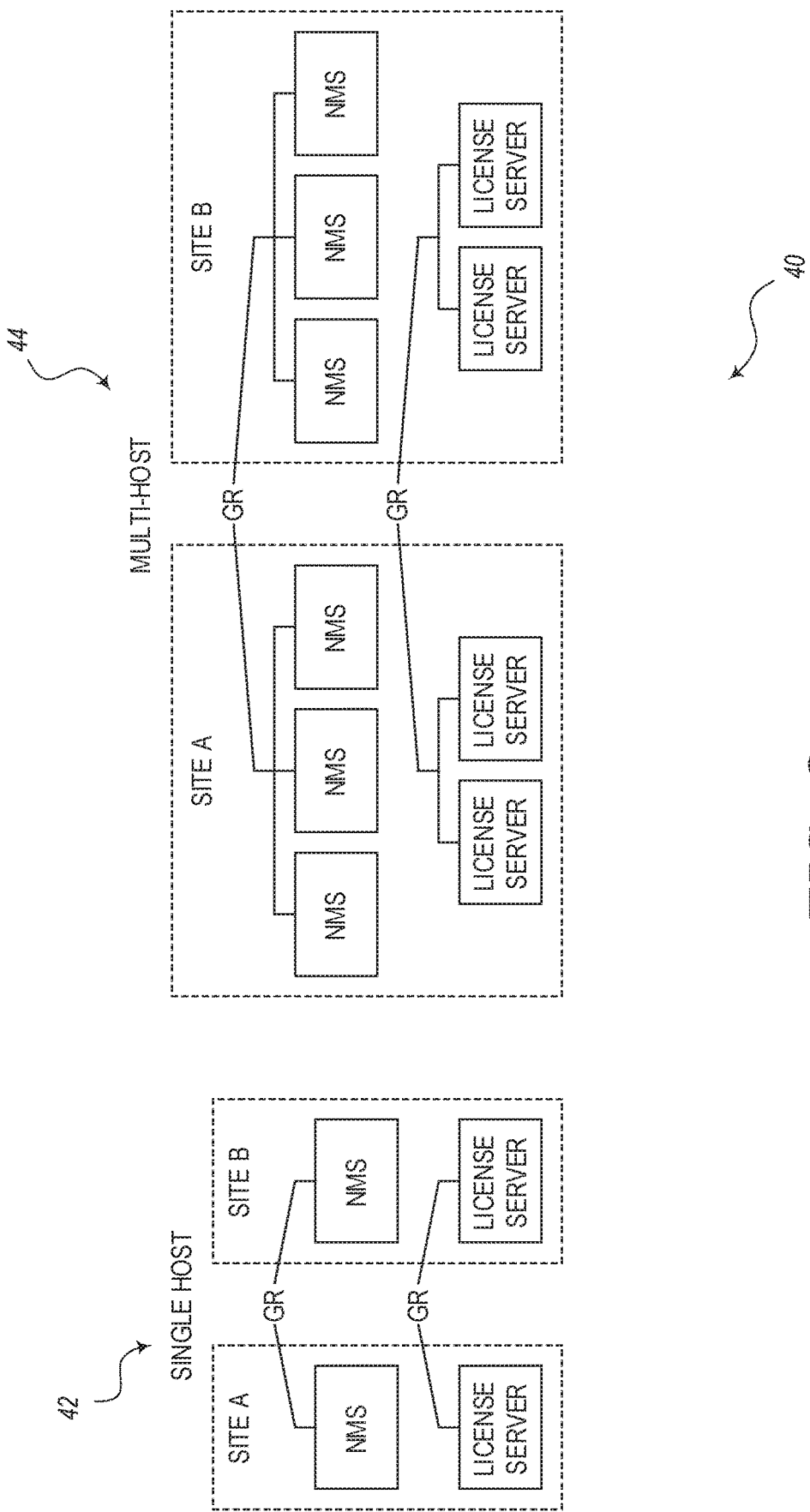
FIG. 2 is a schematic diagram showing a conventional system for a license server deployment.

The process described above with respect to the licensing module 114 may further be configured such that the step of sending the contract address to the customer enables the customer to digitally sign the contract address with a private key corresponding to the public key and provide both the contract address and the digitally signed contract address to the software or hardware product. In some embodiments, the decentralized computing infrastructure may be configured to utilize blockchains. The decentralized computing infrastructure may include the use of the smart contract in place of a license server, as opposed to the conventional system of FIG. 2. The process may further include storing a copy of a distributed ledger on each of the vendor system and customer device. In some embodiments, the software or hardware product may include Zero Touch Provisioning (ZTP) where the software or hardware product automatically downloads and runs a configuration subsequent to activation. The process may further include a step of coordinating delivery of the software or hardware product to the customer to enable the activation of the software or hardware product.

Another novel feature of the systems and methods described in the present disclosure is the decentralized validation of licensing and the decentralized tracking of licensing life cycle. When a product is ordered and a license is created, it may be possible to browse the blockchain (e.g., using etherscan.io). In this way, it may be possible to enable a person to browse information on transactions executed against a contract address.

As suggested above, a benefit of the processes of the present disclosure is that the customer may experience an easier and less time-consuming process for licensing a product. Also, it should be noted that a life cycle tracking procedure may be employed to allow a vendor to comply with regulations. The licensing system 100 may be configured to execute this life cycle tracking procedure.

In the processes described herein, each customer may have a "ledger." However, given that the Ethereum VM (EVM) supports "mapping" (dictionary) as its data structure, nested mapping can be supported inside the contract with the first key defining each customer if only one ledger is preferred. In a company-wide deployment, a large number of servers may be required to decrypt and interpret the contracts. It may not be necessary to require the vendor to actually own the number of servers in this regard. Instead, some implementations may include "Decentralized Applications" (DApps). There may be multiple choices of deployments. In a public blockchain, for example, there are companies that make a business of "mining" the blocks. Otherwise, it could be a private blockchain as a service from an entity (e.g., Microsoft Azure) that allows scaling.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A vendor system in communication with a customer device in a decentralized computing infrastructure, the vendor system comprising
    a processing device, and
    a memory device configured to store a computer program having instructions that, when executed, cause the processing device to
        receive a purchase order from a customer to initiate a purchase of a software or hardware product, the customer associated with the customer device,
        receive a public key from the customer,
        create a smart contract for controlling a license related to the purchase of the software or hardware product, and
        send a contract address associated with the smart contract to the customer to enable the customer to activate the software or hardware product.

2. The vendor system of claim 1, wherein sending the contract address to the customer enables the customer to
    digitally sign the contract address with a private key corresponding to the public key, and
    provide the contract address and the digitally signed contract address to the software or hardware product.

3. The vendor system of claim 1, wherein the decentralized computing infrastructure utilizes blockchains.

4. The vendor system of claim 1, wherein the decentralized computing infrastructure includes the use of the smart contract in place of a license server.

5. The vendor system of claim 1, wherein a copy of a distributed ledger is stored on each of the vendor system and the customer device.

6. The vendor system of claim 1, wherein the software or hardware product includes Zero Touch Provisioning (ZTP) where the software or hardware product automatically downloads and runs a configuration subsequent to activation.

7. The vendor system of claim 1, wherein the instructions further cause the processing device to coordinate delivery of the software or hardware product to the customer to enable the activation of the software or hardware product.

8. A non-transitory computer-readable medium configured to store computer logic in a vendor system in communication with a customer device in a decentralized computing infrastructure, the computer logic having instructions that, when executed, cause one or more processing devices to
    receive a purchase order from a customer to initiate a purchase of a software or hardware product, the customer associated with the customer device,
    receive a public key from the customer,
    create a smart contract for controlling a license related to the purchase of the software or hardware product, and
    send a contract address associated with the smart contract to the customer to enable the customer to activate the software or hardware product.

9. The non-transitory computer-readable medium of claim 8, wherein the instructions, when executed, further cause the one or more processing devices to send the smart contract to the customer device to enable the customer to
    digitally sign the contract address with a private key corresponding to the public key, and
    provide the contract address and the digitally signed contract address to the software or hardware product.

10. The non-transitory computer-readable medium of claim 8, wherein the decentralized computing infrastructure utilizes blockchains.

11. The non-transitory computer-readable medium of claim 8, wherein the decentralized computing infrastructure includes the use of the smart contract in place of a license server.

12. The non-transitory computer-readable medium of claim 8, wherein a copy of a distributed ledger is stored on each of the vendor system and the customer device.

13. The non-transitory computer-readable medium of claim 8, wherein the software or hardware product includes Zero Touch Provisioning (ZTP) where the software or hardware product automatically downloads and runs a configuration subsequent to activation.

14. A method executable by a vendor system in communication with a customer device in a decentralized computing infrastructure, the method comprising the steps of
    receiving a purchase order from a customer to initiate a purchase of a software or hardware product, the customer associated with the customer device,
    receiving a public key from the customer,
    creating a smart contract for controlling a license related to the purchase of the software or hardware product, and
    sending a contract address associated with the smart contract to the customer to enable the customer to activate the software or hardware product.

15. The method of claim 14, wherein the step of sending the contract address to the customer enables the customer to
    digitally sign the contract address with a private key corresponding to the public key, and
    provide the contract address and the digitally signed contract address to the software or hardware product.

16. The method of claim 14, wherein the decentralized computing infrastructure utilizes blockchains.

17. The method of claim 14, wherein the decentralized computing infrastructure includes the use of the smart contract in place of a license server.

18. The method of claim 14, wherein a copy of a distributed ledger is stored on each of the vendor system and the customer device.

19. The method of claim 14, wherein the software or hardware product includes Zero Touch Provisioning (ZTP) where the software or hardware product automatically downloads and runs a configuration subsequent to activation.

20. The method of claim 14, further comprising the step of coordinating delivery of the software or hardware product to the customer to enable the activation of the software or hardware product.

* * * * *